United States Patent
Bontu et al.

(10) Patent No.: US 7,555,227 B2
(45) Date of Patent: Jun. 30, 2009

(54) POLARIZATION COMPENSATION IN A COHERENT OPTICAL RECEIVER

(75) Inventors: Chandra Bontu, Nepean (CA); Maurice O'Sullivan, Ottawa (CA); Kim B. Roberts, Nepean (CA); Han Sun, Nepean (CA); Kuang Tsan Wu, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 599 days.

(21) Appl. No.: 11/294,613

(22) Filed: Dec. 6, 2005

(65) Prior Publication Data

US 2007/0092259 A1    Apr. 26, 2007

Related U.S. Application Data

(60) Provisional application No. 60/728,751, filed on Oct. 21, 2005.

(51) Int. Cl.
H04B 10/06 (2006.01)
(52) U.S. Cl. .................................................. 398/202
(58) Field of Classification Search ......... 398/202–214, 398/147, 158–159
See application file for complete search history.

(56) References Cited

U.S. PATENT DOCUMENTS

| | | | |
|---|---|---|---|
| 4,506,388 A | 3/1985 | Monerie et al. | |
| 4,720,827 A | 1/1988 | Kanaji | |
| 4,723,316 A | 2/1988 | Glance | |
| 4,965,858 A | 10/1990 | Naito et al. | |
| 5,457,563 A | 10/1995 | Van Deventer | |
| 5,473,463 A | 12/1995 | Van Deventer | |
| 5,838,470 A * | 11/1998 | Radehaus et al. | 398/79 |
| 5,995,512 A | 11/1999 | Pogue et al. | |
| 6,473,222 B2 | 10/2002 | Hait et al. | |
| 6,607,311 B1 | 8/2003 | Fishman et al. | |
| 6,782,211 B1 | 8/2004 | Core | |
| 2002/0012152 A1* | 1/2002 | Agazzi et al. | 359/189 |
| 2002/0186435 A1 | 12/2002 | Shpantzer et al. | |
| 2003/0063285 A1 | 4/2003 | Pering et al. | |
| 2003/0123884 A1 | 7/2003 | Willner et al. | |
| 2003/0175034 A1 | 9/2003 | Noe | |
| 2004/0114939 A1* | 6/2004 | Taylor | 398/152 |
| 2005/0196176 A1 | 9/2005 | Sun et al. | |

FOREIGN PATENT DOCUMENTS

EP           1453239 A1    9/2004

(Continued)

OTHER PUBLICATIONS

Richard A. Linke, et al., "High-Capacity Coherent Lightwave Systems", Journal of Lightwave Technology, vol. 6, No. 11, Nov. 1988, pp. 1750-1769.

(Continued)

*Primary Examiner*—Quan-Zhen Wang
(74) *Attorney, Agent, or Firm*—Kent Daniels; Blake, Cassels & Graydon LLP

(57) ABSTRACT

A method of processing a stream of digital samples of an optical signal received by a coherent optical receiver. The digital sample stream is processed to generate a dispersion compensated sample stream. The dispersion compensated sample stream is then processed to compensate polarization dependent impairments of the optical signal.

38 Claims, 4 Drawing Sheets

FOREIGN PATENT DOCUMENTS

| GB | 2214381 A | 8/1989 |
|---|---|---|
| WO | WO 00/60776 A1 | 10/2000 |
| WO | WO 02/27994 A1 | 4/2002 |

OTHER PUBLICATIONS

Chul-Ho Shin, et al., "Heterodyne Optical Phase-Locked Loop by Confocal Fabry-Perot Cavity Coupled A1GaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cia, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler, "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.

Ezra Ip, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication-A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opeoration", Journal of Lightwave Technology, vol. 12, No. 2, Feb. 1994, pp. 325-331.

International Search Report for applicant's corresponding International PCT Application Serial No. PCT/CA2006/001460, Dec. 27, 2006, pp. 1-3.

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

S. CalaBro, et al., "An electrical polarization-state controller and demultiplexer for polarization multiplexed optical signals", Siemens AG, Optical Solutions , pp. 1-2.

Reinhold Noé, Phase Noise-Tolerant Synchronous QPSK/BPSK Baseband-Type Intradyne Receiver Concept With Feedforward Carrier Recovery, Feb. 2005, Journal of Lightwave Technology. vol. 23, No. 2, pp. 802-808.

Reinhold Noé, "PLL-Free Synchronous QPSK Polarization Multiplex/Diversity Receiver Concept With Digital I&Q Baseband Processing", Apr. 2005, IEEE Photonics Technology Letters, vol. 17, No. 4, pp. 887-889.

* cited by examiner

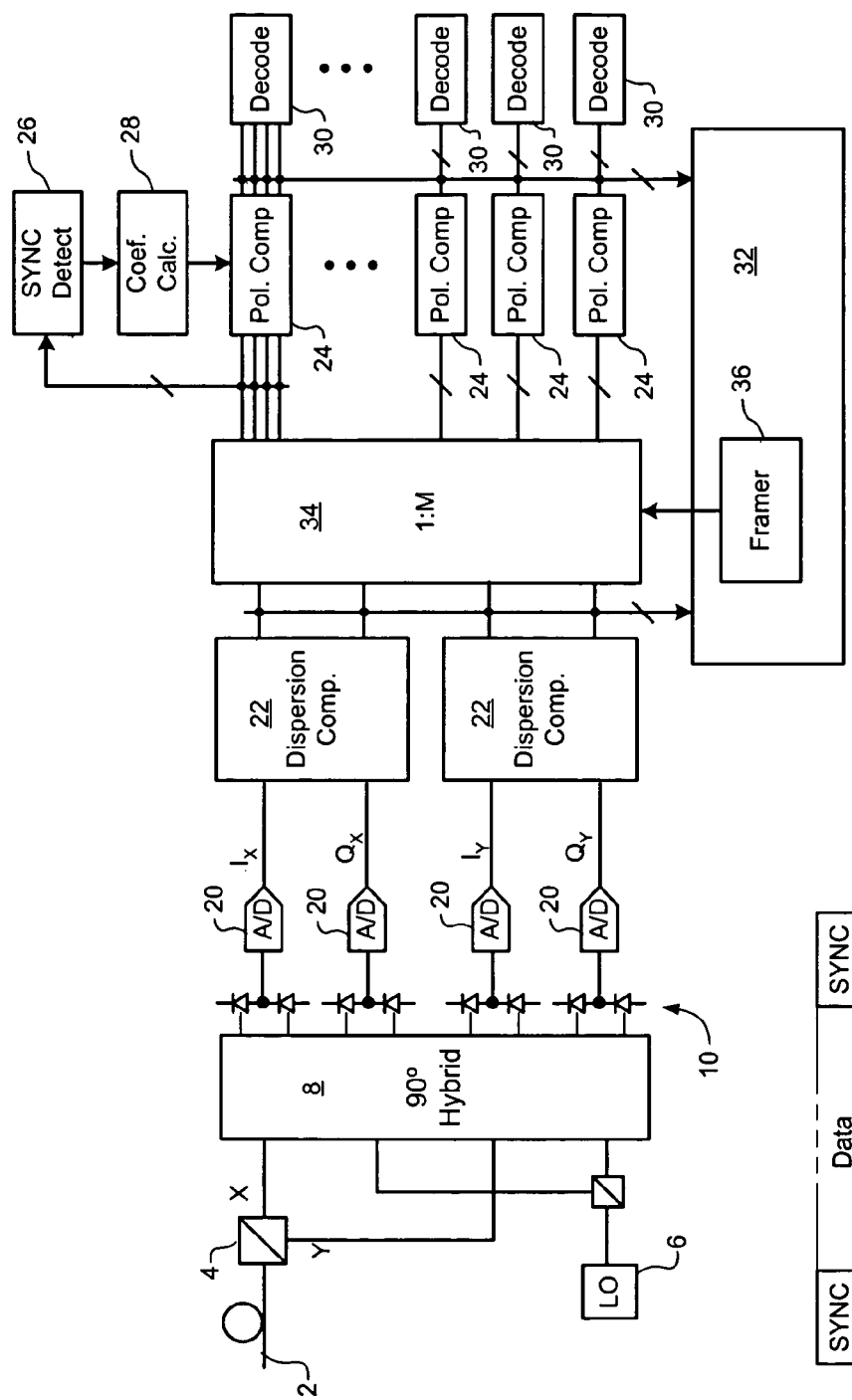
Figure 3A
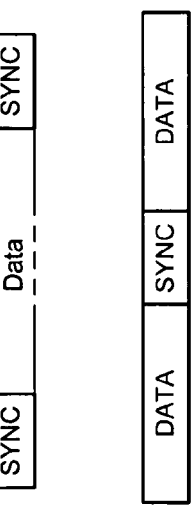
Figure 3B
Figure 3C

POLARIZATION COMPENSATION IN A COHERENT OPTICAL RECEIVER

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

MICROFICHE APPENDIX

Not Applicable.

TECHNICAL FIELD

The present invention relates to optical communications networks, and in particular to a method and apparatus for implementing electronic polarization compensation of optical signals received through an optical communications network.

BACKGROUND OF THE INVENTION

In the optical communications space, techniques used to detect data modulated onto an optical communications signal may be broadly group into two classes, namely "direct" detection and "coherent" detection. In "direct" detection techniques, the optical signal is made incident on a photodetector. The electrical current appearing at the photodetector output is proportional to the optical power which is the square of the optical Electric Field (E-Field). Data modulated onto the optical signal power using an amplitude-modulation scheme, such as On-Off Keying (OOK) can thus be detected by analysis of the photodetector output current. Direct detection techniques have advantages in terms of low cost, and high reliability for On-Off Keying (OOK) based modulation schemes. As a result, the majority of optical receivers currently used in optical communications networks are based on direct detection.

In "coherent" detection techniques, the optical signal is mixed with a strong, narrow-line-width, local oscillator signal by an optical hybrid, and the combined signal made incident on one or more photodetectors. In some systems, the inbound optical signal is first split into orthogonal polarizations, and each polarization processed by a respective optical hybrid. In-phase and Quadrature components of each polarization can be detected using respective photodetectors positioned to receive corresponding signals output by the optical hybrid. The frequency spectrum of the electrical current appearing at the photodetector output(s) is substantially proportional to the convolution of the received optical signal and the local oscillator, and contains a signal component lying at an intermediate frequency that contains the data. Consequently, this "data component" can be isolated and detected by electronically filtering and processing the photodetector output current.

Coherent detection receivers offer numerous advantages over direct detection receivers, many of which follow from the fact that coherent detection techniques provide both phase and amplitude information of the optical signal. As such, more robust modulation schemes, such as phase shift keying (PSK), differential phase shift keying (DPSK) and quadrature phase shift keying (QPSK) can be used.

However, receivers based on coherent detection techniques have suffered disadvantages that have, to date, prevented successful deployment in "real-world" installed communications networks. In particular, optical signals received through conventional optical links are distorted by significant amounts of chromatic dispersion (CD) and polarization dependent impairments such as Polarization Mode Dispersion (PMD), polarization angle changes and polarization dependent loss (PDL). Polarization effects of the fibre link tend to rotate the transmitted polarizations, so that, at the receiver, they will typically be neither orthogonal to each other nor aligned with the polarization beam splitter of the optical hybrid. As a result, each of the received polarizations (downstream of the polarization beam splitter) contain energy from both of the transmitted polarizations, as well as artefacts due to CD, PMD and PDL. These problems are compounded for polarization-division multiplexed signals, in which each transmitted polarization contains a respective different data signal. In such cases, each received polarization contains a mixture of both of the transmitted data signals, so that, in addition to compensating CD, PMD and PDL, it is also necessary to separate these data signals from one another.

Various methods have been proposed for addressing these problems. For example, a quadrature coherent receiver with electronic polarization compensation is described by R Noé, in: "*Phase Noise-Tolerant Synchronous QPSK/BPSK Baseband-Type Intradyne Receiver Concept With Feedforward Carrier Recovery*", Journal of Lightwave Technology, Vol. 23, No. 2, February 2005, and "*PLL-Free Synchronous QPSK Polarization Multipex/Diversity Receiver Concept with Digital I&Q Baseband Processing*", IEEE Photonics Technology Letters, Vol. 17, No. 4, April 2005. In this respect, it will be noted that Noé also alludes (in the introduction) to the possibility of also compensating chromatic dispersion. However, Noé does not provide any teaching as to how this would be done. The applicability of RF channel estimation techniques to the detection of polarization-division multiplexed optical signals in a quadrature coherent receiver is described by Y. Han et al. in "*Coherent optical Communication Using Polarization Multiple-Input-Multiple-Output*", OPTICS EXPRESS Vol. 13, No. 19, pp 7527-7534, 19 Sep. 2005.

One commonly used method of addressing the problem of dispersion in high-bandwidth communications systems is by inserting one or more optical dispersion compensators, within the link. Such dispersion compensators may, for example, take the form of length of fibre, a Mach Zehnder interferometer, an optical resonator, or a Bragg reflector. Some of these compensators can also produce a controllable amount of compensation, which enables mitigation of time-variant dispersion effects. In either case, these compensators are intended to at least partially offset the signal distortions introduced by the system transfer function H(w). The compensation function C(w) implemented by the optical dispersion compensator is a dispersive function that is selected to optimize performance of the link. In a fully linear system, the compensation function C(w) would preferably be equivalent to the complex conjugate H*(w) of the transfer function H(w), in which case H(w)*C(w)=1, and the combined effect of H(w) and C(w)=H*(w) would be an undistorted received signal that exactly corresponds to the transmitted optical signal. However, limitations of optical components, and the time-varying amount of compensation required, make this objective very difficult to achieve. Additionally, optical compensators are expensive and introduce significant optical losses. These losses must be offset by means of additional optical gain which introduces more optical noise. The additional (or higher-performance) optical amplifiers required to provide this increased gain further increases the total cost of the communications system. In addition, the presence of optical dispersion compensators and high performance amplifiers distributed along the length of the link provides a significant technical barrier to system evolution. For example, implementation of optical switching (e.g. at the transmitter and/or receiver ends of the link, or an intermediate site without electrical termination) necessarily requires adjustment of optical amplifiers, in order to accommodate changing energy states within the link.

FIG. 1 schematically illustrates the system of Noé (Supra, April 2005). As may be seen in FIG. 1, an optical signal received through an optical link 2 is divided by a polarization beam splitter 4 into orthogonal polarizations (nominally referred to as X and Y polarizations in FIG. 1), which are then mixed with a local oscillator (LO) 6 through a quadrature 90° optical hybrid 8. The composite optical signals appearing at the output of the optical hybrid are made incident on a set of photodetectors 10 to generate analog electrical signals Ix, Qx, Iy, Qy respectively corresponding to real (Re) and imaginary (Im) parts of each polarization. These analog signals are then supplied to a clock recovery circuit 12, before being sampled at the symbol rate by respective Analog-to-Digital (A/D) converters 14 to generate digital sample streams of each of the real (Re) and imaginary (Im) parts of each polarization. The digital samples are then supplied to a 1:M DEMUXer 16, which splits the data path into M parallel sample streams having a lower sample rate (by a factor of M), each of which is supplied to a respective processing module 18. Within each processing module 18, an inverse Jones matrix that models the polarization performance of the optical link is used to compensate polarization distortions. The polarization compensated samples can then be decoded for data recovery.

In practical networks, the inbound optical signal can exhibit very high speed polarization transients. For example, polarization angle transients (rotations) at rates in excess of 2 KHz are common, and rotation rates in excess of 20 KHz have been observed by the inventors. Because of the high sensitivity of coherent detection systems to polarization angle, any receiver intended to be deployed in a real-world communications network, as opposed to a computer simulation or laboratory bench-top, must be able to track (that is, compensate) these transients.

While the system of Noé is satisfactory in a laboratory setting, it cannot track high speed transients of the type encountered in real-world communications networks. This is due, at least in part, to the slow speed (M/g symbol durations) at which the inverse Jones matrix coefficients can be updated. Thus, for example, Noé, claims that with a 10 GBaud signal, the inverse Jones matrix coefficients can be updated with a period of 16 µS. This is far too slow to successfully track 20 kHz polarization rotations, which have a period of 50 µS. In addition, the system of Noé tends to fail in the presence of severe Chromatic Dispersion (CD), at least in part due to failure of the clock recovery circuit as inter-symbol interference (ISI) increases, and consequent uncertainty of the sample timing of the A/D converters. Signals that are severely distorted by chromatic dispersion (e.g. greater than about 1000 picoseconds per nanometer) are spread out to such a degree that it is not feasible to recognize the symbols, and so one is not able to distinguish the two polarization division multiplexed signals from the two received polarizations.

Accordingly, techniques enabling polarization compensation of polarization transients, in the presence of severe dispersion, remains highly desirable.

SUMMARY OF THE INVENTION

Accordingly, an object of the present invention is to provide methods enabling a polarization compensation of high speed polarization transients.

Thus, an aspect of the present invention provides a method of processing a stream of digital samples of an optical signal received by a coherent optical receiver. The digital sample stream is processed to generate a dispersion compensated sample stream. The dispersion compensated sample stream is then processed to compensate polarization dependent impairments of the optical signal.

Another aspect of the present invention provides a method of training a coherent optical receiver to compensate impairments of an optical link. A first set of filter coefficients adapted to compensate impairments exhibiting low speed transients, and a second set of filter coefficients adapted to compensate impairments exhibiting high speed transients are computed. Both sets of coefficients can then be downloaded to a filter block of the coherent optical receiver.

BRIEF DESCRIPTION OF THE DRAWINGS

Further features and advantages of the present invention will become apparent from the following detailed description, taken in combination with the appended drawings, in which:

FIGS. 3A-3C schematically illustrate principal elements of a coherent optical receiver in accordance with another aspect of the present invention.

It will be noted that throughout the appended drawings, like features are identified by like reference numerals.

DETAILED DESCRIPTION OF THE PREFERRED EMBODIMENT

The present invention provides methods and systems enabling robust compensation of polarization dependent impairments, in the presence of severe dispersion. Embodiments of the invention are described below, by way of example only, with reference to FIGS. 2-4.

In general, the present invention operates by implementing separate training loops for training the dispersion and polarization compensation functions. In one embodiment, this is implemented by separating the dispersion and polarization compensation functions into discrete filter blocks cascaded within a common data path or pipeline, and then implementing a respective different training loop for training each filter block. In this embodiment, the digital sample stream generated by sampling the optical signal is first processed to compensate chromatic dispersion (CD). The dispersion compensated sample stream is then processed to compensate polarization dependent impairments. Separation of the dispersion and polarization compensation functions in this manner increases the complexity of the dispersion compensator, but with the benefit that it allows a reduction in the size and complexity of the Polarization Compensator. In practice, a filter width as small as 5 samples has been found to yield satisfactory polarization compensation performance. As will be described in greater detail below, this enables filter coefficients to be updated at high enough rates to track even high speed polarization transients. FIG. 2 schematically illustrates a representative coherent optical receiver in which this separation of dispersion and polarization compensations functions is implemented.

Figure 1:
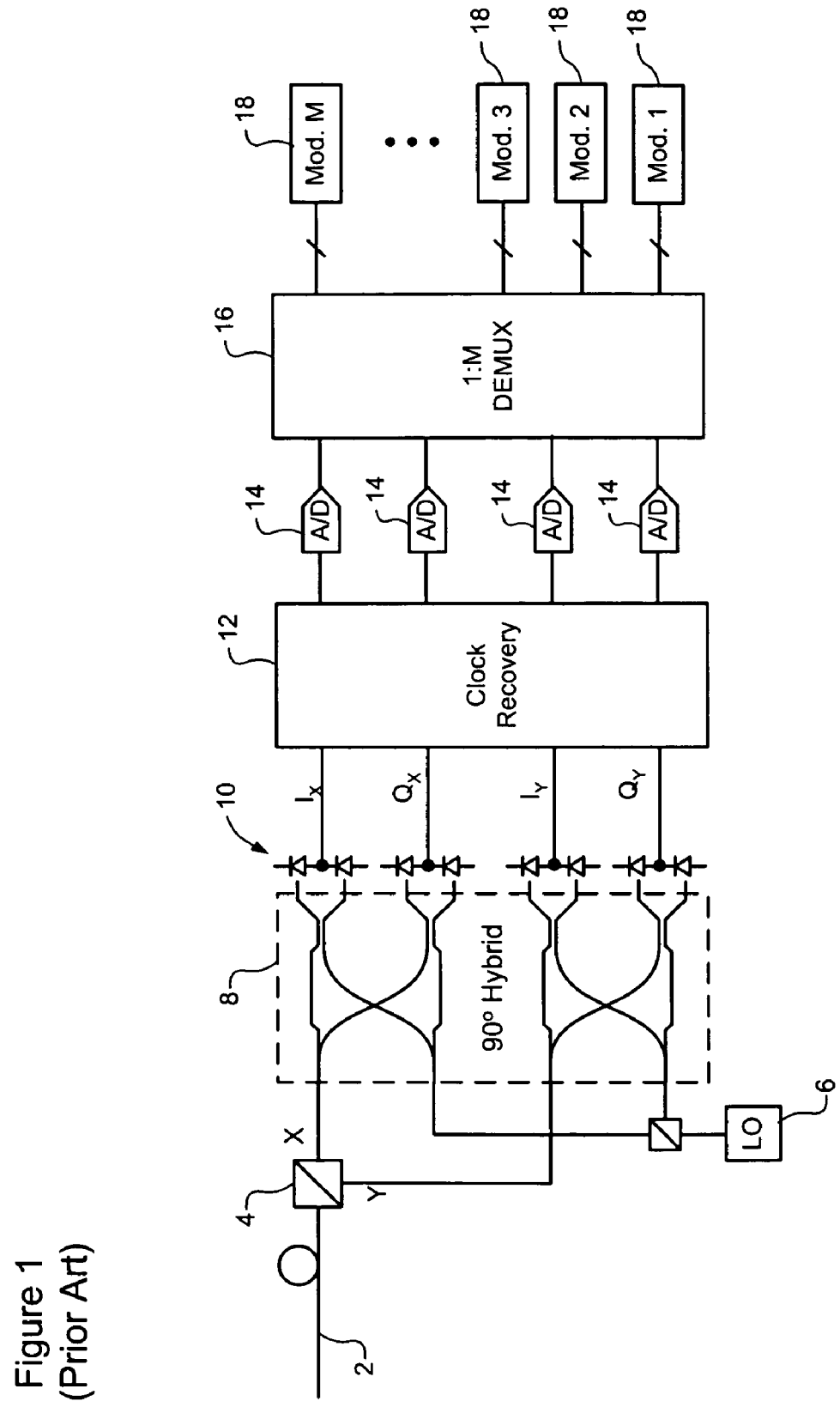
FIG. 1 is a block diagram schematically illustrating principal elements of a coherent optical receiver known in the prior art.
Figure 2A:
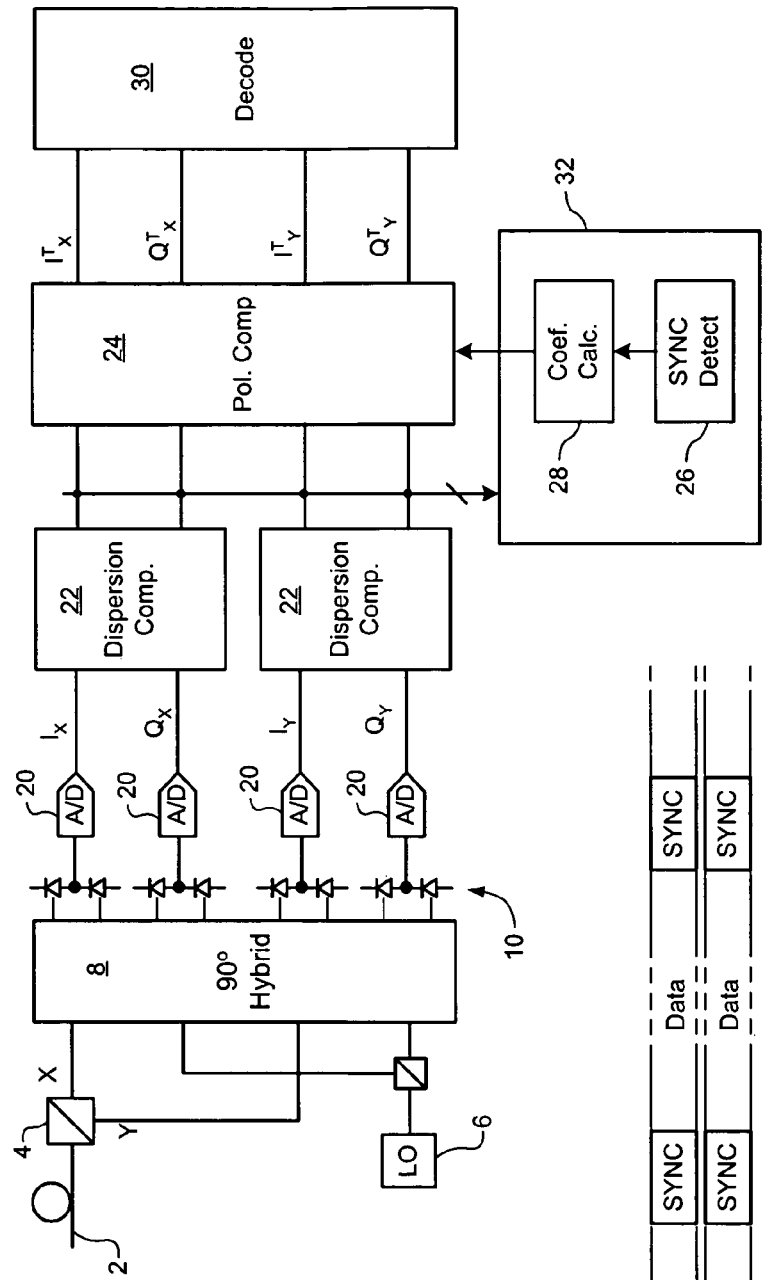
FIGS. 2A-2C schematically illustrate principal elements of a coherent optical receiver in accordance with an aspect of the present invention.

In the coherent optical receiver of FIG. 2A, an inbound optical signal is received through an optical link 2, split into orthogonal polarizations by a Polarization Beam Splitter 4, and then mixed with a Local Oscillator (LO) signal 6 by a conventional 90° optical hybrid 8. The optical signal may, for example be a high speed optical signal having a bit rate exceeding 2.5 GHz. In some embodiments, the optical signal may be a polarization-division multiplexed signal having a QPSK symbol rate of 10 GHz on each transmitted polarization. The composite optical signals emerging from the optical hybrid are supplied to respective photodetectors 10, which generate corresponding analog signals. The photodetector signals are sampled by respective Analog-to-Digital (A/D) converters 20 to yield multi-bit digital sample streams corresponding to In-phase (I) and Quadrature (Q) components of each of the received polarizations.

As may be appreciated, the resolution of the A/D converters 20 is a balance between performance and cost. Increasing the resolution improves sampling accuracy, and thereby improves the extent to which signal distortions can be corrected by downstream dispersion and polarization compensators. However, this increased accuracy is obtained at a cost of increased complexity, silicon area and heat generation. It has been found that a resolution of less than 4 bits is insufficient for satisfactory dispersion and polarization compensation. In practice, a resolution of 5 or 6 bits provides satisfactory performance, at an acceptable cost. Preferably, the sample rate of the A/D converters is selected to satisfy the Nyquist criterion, for the highest anticipated symbol rate of the received optical signal. As will be appreciated, Nyquist sampling ensures that the sample streams generated at the A/D converter outputs contain all of the information content of each signal, even if the sample timing (with reference to each received symbol) is ambiguous and/or unknown.

From the A/D converter 20 block, the I and Q sample streams of each received polarization are supplied to a respective dispersion compensator 22, which operates on the sample stream to compensate chromatic dispersion of the optical link. Various methods are known for performing this function, such as, for example Finite Impulse Response (FIR) filters.

As is known in the art, the amount of chromatic dispersion that can be compensated in this manner depends on the width (in samples) of the filter. In preferred embodiments, a filter width of 50 or more samples may be used, in order to provide a satisfactory balance between compensation performance and cost. A filter width of 256 samples has been found to enable compensation of even severe chromatic dispersion ($\geq$1000 Ps/nm) at acceptable cost. A training loop for calculating the dispersion compensator coefficients (and thereby training the dispersion compensator) can be implemented using known methods. Thus, for example, the total chromatic dispersion can be measured using any of a variety of known methods, and the measured dispersion used to compute updated filter coefficients which are then downloaded to the dispersion compensators 22.

As is well known in the art, filters with large numbers of coefficients are not able to be adapted in a manner that is simultaneously rapid and accurate in the presence of additive noise. Thus, when compensating for significant amounts of chromatic dispersion, the adaptation response time (that is, the training-loop delay required to measure dispersion; compute updated coefficients; and download them to the dispersion compensators 22) will typically be greater than one millisecond, in order to provide sufficient accuracy. In some embodiments, significantly longer adaptation response times (e.g. on the order of a second or more) are sufficient to track observed variation rates in chromatic dispersion.

The dispersion-compensated sample streams appearing at the output of the dispersion compensators 22 are then supplied to a polarization compensator 24, which operates to de-convolve the transmitted I and Q signal components of each polarization from the dispersion-compensated sample streams. Various methods may be used to implement the polarization compensator 24, such as, for example, a Finite Impulse Response (FIR) filter which receives the four dispersion-compensated sample streams, and which outputs respective sample streams corresponding to the original I and Q signal components of each transmitted polarization.

As will be appreciated, successful de-convolution of the transmitted I and Q signal components, in the presence of high-speed polarization transients, requires continuous high-speed training of the polarization compensator 24. In effect, this means that the filter coefficients must be recalculated with sufficient speed and frequency to track changes in the polarization state of the received optical signal. For optical links in which maximum polarization transients of 2 KHz or less are expected, a recalculation frequency as low as 10 KHz may be sufficient. As the anticipated polarization transient rates increase, so too must the recalculation frequency of the filter coefficients. Thus, in some embodiments, recalculation rates in excess of 100 KHz will be desired. In one embodiment, this is accomplished by formatting the optical communications signal into fixed-length data packets separated by comparatively short SYNC bursts having a respective predetermined bit (or, equivalently, symbol) sequence on each transmitted polarization. The bit (symbol) sequences of each polarization are preferably transmitted simultaneously, but this is not necessary. With this arrangement, a SYNC detector 26 can implement known correlation techniques to detect the bit sequences of each SYNC burst within each of the dispersion-compensated sample streams. The correlation coefficients calculated by the SYNC detector 26 can then be used by a coefficient calculator 28 to compute updated filter coefficients which are then downloaded to the polarization compensator 24.

Figure 2B:
Figure 2C:
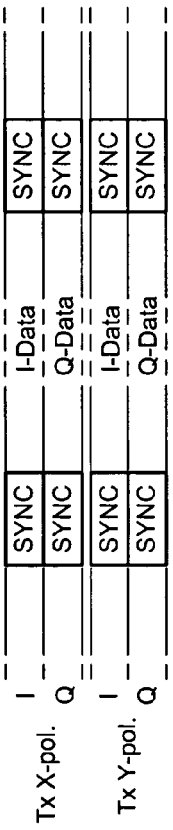

In one variation, two orthogonal bit sequences are used in each SYNC burst; each bit sequence being assigned to a respective transmitted polarization, as may be seen in FIG. 2b. In an alternative arrangement, each of the I and Q components of each transmitted polarization is assigned a respective orthogonal bit sequence, as may be seen in FIG. 2c, which allows the SYNC detector to independently detect each transmitted signal component within the dispersion compensated sample streams.

In some embodiments, the SYNC burst frequency is about 1000 times lower than the symbol rate of the optical communications signal. Thus, for an optical communications system in which the symbol rate is 10 GHz, the SYNC burst frequency will be about 10 MHz. The small size of the polarization compensator enabled by the present invention means that the SYNC detector and coefficient calculator can form a "high-speed" training loop capable of re-computing and downloading the filter coefficients during the interval between successive SYNC bursts. Such frequent coefficient updating facilitates near real-time tracking and compensation of polarization transients having rates well in excess of 50 KHz.

A decoder 30 connected downstream of the polarization compensator can then implement known methods to detect symbol and/or data values from the distortion compensated signal output from the polarization compensator.

As may be seen in FIG. 2, the SYNC detector 26 and coefficient calculator 28 can conveniently be implemented within a controller unit 32 or state machine that is connected to receive at least a portion of the dispersion compensated sample stream. Preferably, the controller 32 unit lies outside of the data path, and runs at a lower clock speed than the data path.

In the embodiment of FIG. 2A, a single polarization compensator 24 is cascaded with the dispersion compensators 22 in a single data path. For very high-speed optical communications signals, it will be preferable to provide multiple parallel data paths running at lower speed. FIG. 3 illustrates an embodiment in which the data path is divided downstream of the dispersion compensator 22, so that polarization compensation (and, in the illustrated example, data detection) is performed independently in each parallel path.

As may be seen in FIG. 3A, a 1:M distribution block 34 operates to divide the signal path, by selectively routing blocks of samples from the dispersion compensators 22 into each one of the M paths. In some embodiments, this operation may be performed using a conventional 1:M DEMUXer, in which case samples of the four dispersion compensated signals can be directed into each data path with any desired granularity. In such cases, detection of SYNC bursts and computation of polarization compensator coefficients may be performed outside of the data path, and the updated coefficients downloaded to each of the parallel polarization compensators 24. A more robust solution is to implement the distribution block 34 as a "burst switch" controlled by a framer 36, as shown in FIG. 3A. In this case, each data path receives sample sub-streams in the form of a block of samples encompassing (for each samples stream) a complete data packet and at least one of the immediately preceding and trailing SYNC bursts, as may be seen in FIG. 3B. Alternatively, the distribution block can operate so that each sub-stream comprises a block of samples encompassing one SYNC burst bracketed between immediately adjacent portions of leading and trailing data packets, as may be seen in FIG. 3B. With either sub-stream format, this arrangement has an advantage in that each path can be provided with an independent SYNC detector 26 and coefficient calculator6 28, and thus can independently compute filter coefficients for its own polarization compensator 24. This, in turn, permits use of a larger filter width (and thus improved compensation accuracy) than would otherwise be possible without degrading the ability of the system to track and compensate high speed polarization transients.

The framer 36 may, for example, operate on the basis of the dispersion compensated sample stream and/or the polarization compensated sample stream to detect each SYNC burst, and generate appropriate framing signals for controlling the distribution block 34. One implementation of a burst switch may, for example, include a multi-port Random Access Memory (RAM), which allows samples to be simultaneously supplied to two or more data paths. This allows for overlap between the respective sample sub-streams in at least two data paths. For example, an overlap equal to the length of a SYNC burst would mean that each sample sub-stream is formed as a block of samples encompassing a complete data packet and both of the immediately preceding and trailing SYNC bursts.

Figure 4:
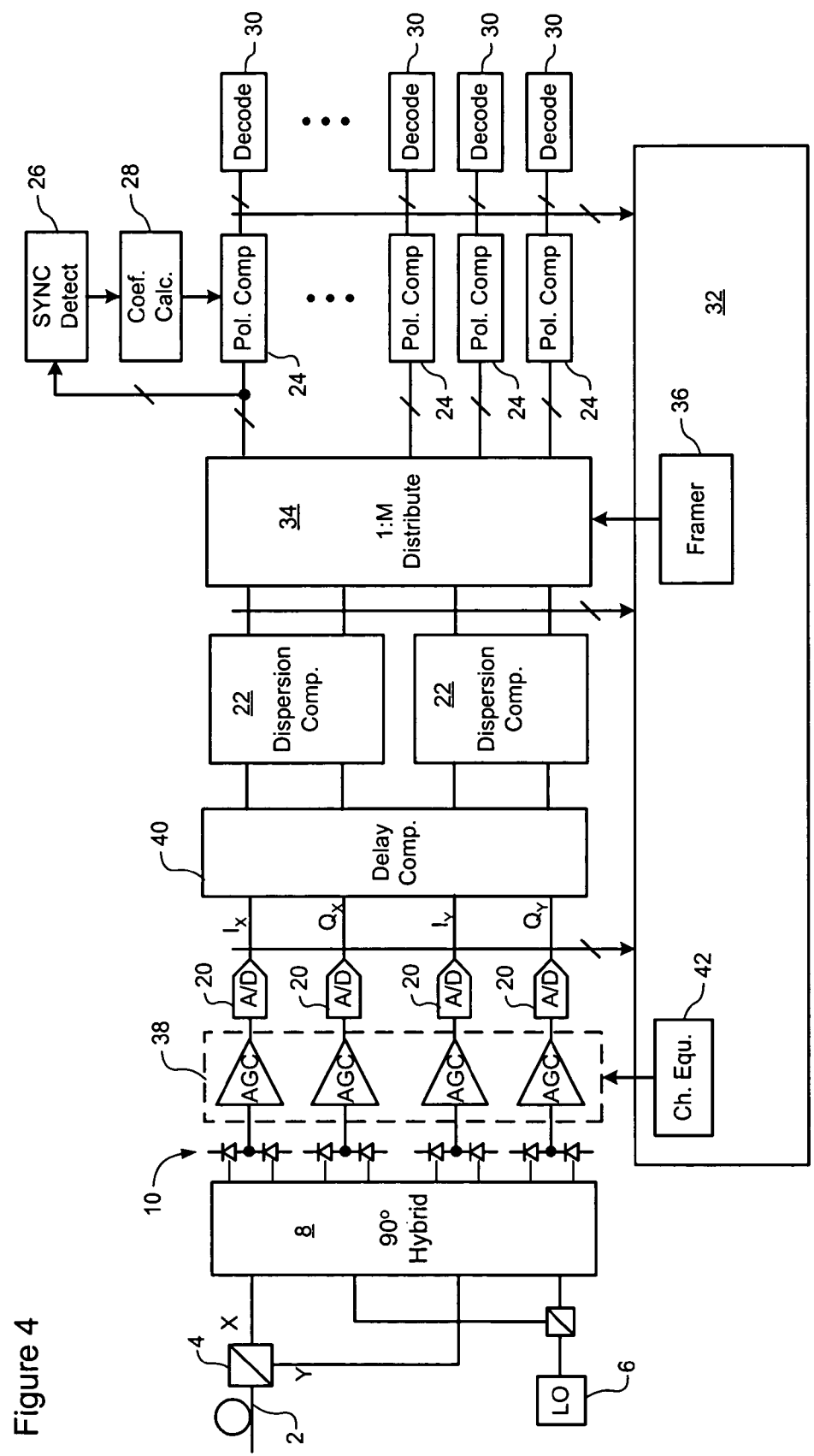
FIG. 4 is a block diagram schematically illustrating principal elements of a coherent optical receiver in accordance with another aspect of the present invention.

FIG. 4 illustrates a coherent receiver of the type illustrated in FIG. 3, which includes additional signal processing functionality upstream of the dispersion compensators 22. In the example of FIG. 4, a variable gain amplification (VGA) block 38 is inserted upstream of the A/D converters 20, and a coarse delay compensator 40 is inserted upstream of the dispersion compensators 22.

The VGA block 38 implements a channel equalizer 42, which ensures substantially equal RMS signal levels at the A/C converter 20 inputs. The coarse delay compensator 40 operates to ensure alignment between corresponding samples supplied to the dispersion compensators 22. As such, the coarse delay compensator 40 implements a first-in-first-out (FIFO) buffering operation that adjusts the timing of each sample stream to compensate for path length differences through the optical hybrid 8, as well as manufacturing variations that result in differences in the signal propagation delays through the photodetectors 10, VGA block 38 and A/D converter 20 block.

Those of ordinary skill in the art will recognize that the A/D converters 20, dispersion compensators 22, polarization compensator(s) 24 and decoder(s) 30 discussed above and illustrated in FIGS. 2-4 may be implemented using any suitable combination of hardware and software. In receiver systems designed to receive very high speed optical communications signals, it will be desirable to implement at least the A/D converters 20, dispersion compensators 22, polarization compensator(s) 24 and decoder(s) 30 on a common chip. Such design considerations are considered to lie within the purview of those skilled in the art, and thus are not discussed in detail herein.

In the embodiments of FIGS. 2-4, the dispersion and polarization compensation functions are provided by separate filter blocks cascaded within the data path. However, it will be appreciated that both functions could be integrated within a common filter block, In this case, the filter block would be sized to provide satisfactory dispersion compensation performance, using filter coefficients calculated by merging the results of both the low-speed and high-speed training loops. Thus, for example, a low-speed training loop can be used to calculate updated filter coefficients which primarily compensate chromatic dispersion, as described above, with an update interval on the order of minutes. At the same time, a high speed training loop is used to calculate filter coefficients which primarily compensate polarization, also as described above, with an update frequency on the order of several MHz, for example. Merging the two sets of coefficients, and then downloading the resulting "composite" coefficients to the filter block allows simultaneous compensation of both chromatic dispersion and polarization. In order to track polarization transients, the computation and downloading of the composite coefficients would be run at the same frequency as the high-speed training loop. In order enable high-speed computation of the polarization compensation coefficients, the effects of the dispersion compensation filter coefficients can be deconvolved from the filtered signal in order to make the effects of the polarization compensation coefficients visible. Alternatively, a portion of the signal, or a copy of a portion of the signal can be processed in two distinct filters in order to allow computation of each set of filter coefficients. Once calculated separately, these coefficients can be combined and applied to the majority (or whole) of the signal in a parallel path. This variation provides the net functionality of two sequential processing stages, while providing the opportunity for efficiencies from sharing or optimizing the circuit that implements the high speed processing.

In the embodiments illustrated in FIGS. 2-4, a single polarization compensator 24 is shown in each data path. However, it will be appreciated that the polarization compensator 24 may be provided as two or more cascaded logical and/or physical blocks, each of which performs a portion of the polarization compensation function.

If desired, a portion of the dispersion compensation, or other filtering can be combined with the polarization compensation function.

In the foregoing description, linear filtering operations are shown for clarity and simplicity of description. However, it will be appreciated that nonlinear operations can be applied using similar principles.

Further processing stages can also be applied after the polarization processing, before the signal is decoded.

In the embodiments of FIGS. 2-4, at least the high-speed (polarization) training loop uses a repeating SYNC burst within the received optical signal. This arrangement is advantageous in that it provides a simple way of enabling the required high-speed recalculation of filter coefficients. However, it is also possible to drive the high-speed training loop based on decision output of the data detector. In such a "decision directed" training loop, the symbol values decided upon by the decoder are compared to their corresponding sample values (at the decoder input), and the comparison result used to re-compute the filter coefficients. If desired, it is possible to design an optical receiver which uses both methods. It is also possible to implement a control system which selects one method for a given operating state of the receive, and switches to the other method in a different operating state.

The embodiment(s) of the invention described above is (are) intended to be illustrative only. The scope of the invention is therefore intended to be limited solely by the scope of the appended claims.

We claim:

1. In a coherent optical receiver for receiving a high speed optical signal, a method of processing a stream of digital samples of the optical signal, the method comprising steps of:
    processing the digital sample stream using dispersion compensation coefficients computed by a first training loop to generate a dispersion compensated sample stream; and
    processing the dispersion compensated sample stream using polarization compensation coefficients computed by a second training loop to compensate polarization dependent impairments of the optical signal;
    wherein an adaptation response time of the first training loop is at least 10 times slower than the adaptation response time of the second training loop.

2. A method as claimed in claim 1, wherein the digital sample stream comprises at least one stream of multi-bit digital samples of each received polarization of the optical signal.

3. A method as claimed in claim 2, wherein the number of bits resolution of each stream of multi-bit digital samples is at least 4.

4. A method as claimed in claim 2, wherein the at least one stream of multi-bit digital samples of a received polarization comprises In-phase (I) and Quadrature (Q) multi-bit sample streams, respectively representing In-phase (I) and Quadrature (Q) components of the received polarization.

5. A method as claimed in claim 1, wherein the optical signal comprises a stream of data packets separated by SYNC bursts having a respective predetermined bit sequence on each transmitted polarization.

6. A method as claimed in claim 5, wherein the respective predetermined bit sequence on each transmitted polarization comprises a pair of orthogonal bit sequences respectively allocated to In-phase and Quadrature components of the respective transmitted polarization.

7. A method as claimed in claim 5, wherein the optical signal includes two transmitted polarizations, and the predetermined bit sequences on each transmitted polarization are orthogonal to each other.

8. A method as claimed in claim 5, wherein the step of processing the dispersion compensated sample stream comprises steps of:
    analysing the dispersion compensated sample stream to detect the respective predetermined bit sequence on each transmitted polarization of a SYNC burst; and
    computing the polarization compensation coefficients using the detection results.

9. A method as claimed in claim 8, wherein the steps of analysing the dispersion compensated sample stream and computing filter coefficients are repeated for each SYNC burst of the optical signal.

10. A method as claimed in claim 1, wherein the step of processing the dispersion compensated sample stream comprises steps of:
    dividing the dispersion compensated sample stream into a plurality of parallel sub-streams; and
    processing each sub-stream in parallel.

11. A method as claimed in claim 10, wherein the optical signal comprises a stream of data packets separated by SYNC bursts having a respective predetermined bit sequence on each transmitted polarization, and wherein each sub-stream includes a respective block of successive samples encompassing a complete data packet and at least one immediately adjacent SYNC burst.

12. A method as claimed in claim 10, wherein the optical signal comprises a stream of data packets separated by SYNC bursts having a respective predetermined bit sequence on each transmitted polarization, and wherein each sub-stream includes a respective block of successive samples encompassing a SYNC burst and at least an immediately adjacent portion of a data packet.

13. A coherent optical receiver for receiving a high speed optical signal, comprising:
    a dispersion compensator for processing a digital sample stream of the optical signal using dispersion compensation coefficients computed by a first training loop to generate a dispersion compensated sample stream; and
    a polarization compensator for processing the dispersion compensated sample stream using polarization compensation coefficients computed by a second training loop to compensate polarization dependent impairments of the optical signal;
    wherein an adaptation response time of the first training loop is at least 10 times slower than the adaptation response time of the second training loop.

14. A receiver as claimed in claim 13, wherein the digital sample stream comprises at least one stream of multi-bit digital samples of each received polarization of the optical signal.

15. A receiver as claimed in claim 14, wherein the number of bits resolution of each stream of multi-bit digital samples is at least 4.

16. A receiver as claimed in claim 14, wherein the at least one stream of multi-bit digital samples of a received polarization comprises In-phase (I) and Quadrature (Q) multi-bit sample streams, respectively representing In-phase (I) and Quadrature (Q) components of the received polarization.

17. A receiver as claimed in claim 16, wherein the dispersion compensator is adapted to treat each of the I and Q sample streams of each received polarization as real value sample streams.

18. A receiver as claimed in claim 14, further comprising a distribution block for dividing the dispersion compensated sample stream into a plurality of parallel sub-streams, and a respective polarization compensator being coupled to each output of the distribution block for processing each sub-stream in parallel.

19. A receiver as claimed in claim 18, wherein the optical signal comprises a stream of data packets separated by SYNC bursts having a respective predetermined bit sequence on each transmitted polarization, and wherein each sub-stream includes a respective block of successive samples encompassing a complete data packet and at least one immediately adjacent SYNC burst.

20. A receiver as claimed in claim 18, wherein the optical signal comprises a stream of data packets separated by SYNC bursts having a respective predetermined bit sequence on each transmitted polarization, and wherein each sub-stream includes a respective block of successive samples encompassing a SYNC burst and at least an immediately adjacent portion of a data packet.

21. A receiver as claimed in claim 18, further comprising, in respect of each polarization compensator:
a SYNC detector for analyzing the respective sub-stream to detect a predetermined bit sequence on each transmitted polarization of a SYNC burst of the optical signal; and
a respective coefficient calculator for computing the polarization compensation coefficients using the detection results.

22. A receiver as claimed in claim 13, wherein the optical signal comprises a stream of data packets separated by SYNC bursts having a respective predetermined bit sequence on each transmitted polarization.

23. A receiver as claimed in claim 22, wherein the respective predetermined bit sequence on each transmitted polarization comprises a pair of orthogonal bit sequences respectively allocated to In-phase and Quadrature components of the respective transmitted polarization.

24. A receiver as claimed in claim 22, wherein the optical signal includes two transmitted polarizations, and the predetermined bit sequences on each transmitted polarization are orthogonal to each other.

25. A receiver as claimed in claim 22, further comprising:
a SYNC detector for analysing the sample stream to detect the respective predetermined bit sequence on each transmitted polarization of a SYNC burst; and
a coefficient calculator for computing the polarization compensation coefficients using the detection results.

26. A method of training a coherent optical receiver to compensate impairments of an optical link, the method comprising steps of:
computing a first set of filter coefficients using a first training loop, the first set of filter coefficients compensating impairments exhibiting low speed transients; and
computing a second set of filter coefficients using a first training loop, the first set of filter coefficients compensating impairments exhibiting high speed transients;
wherein an adaptation response time of the first training loop is at least 10 times slower than the adaptation response time of the second training loop.

27. A method as claimed in claim 26, wherein the first set of filter coefficients are adapted to compensate chromatic dispersion.

28. A method as claimed in claim 27, wherein a magnitude of the chromatic dispersion is 1000 pS/nm or more.

29. A method as claimed in claim 27, wherein the step of computing a first set of filter coefficients comprises steps of:
measuring chromatic dispersion of the optical link; and
computing the first set of filter coefficients based on the measurement result.

30. A method as claimed in claim 27, wherein computing the second set of filter coefficients comprises steps of:
sampling an optical signal received through the optical link to generate a sample stream;
processing the sample stream to decide a value of one or more symbols conveyed through the optical link by the optical signal;
comparing the decided symbol values to corresponding sample values; and
computing the second set of filter coefficients based on the comparison result.

31. A method as claimed in claim 27, wherein computing a second set of filter coefficients comprises steps of:
sampling an optical signal received through the optical link to generate a sample stream;
processing the sample stream to detect a SYNC burst having a respective predetermined bit sequence on each transmitted polarization of the optical signal; and
computing the second set of filter coefficients based on the detection result.

32. A method as claimed in claim 26, wherein the adaptation response time of the first training loop is one minute or more.

33. A method as claimed in claim 26, wherein the second set of filter coefficients are adapted to compensate polarization dependent impairments.

34. A method as claimed in claim 33, wherein the polarization dependent impairments comprise any one or more of:
polarization dependent loss;
polarization mode dispersion;
an angle of each polarization of an optical signal received through the optical link.

35. A method as claimed in claim 26, wherein the adaptation response time of the second training loop is sufficient to track transients having rates exceeding 50 KHz.

36. A method as claimed in claim 35, wherein the adaptation response time of the second training loop is such that the step of computing the second set of filter coefficients is repeated at a rate of at least 10 kHz.

37. A method as claimed in claim 26, further comprising a step of downloading the first and second sets of filter coefficients to respective filter blocks of the coherent optical receiver.

38. A method as claimed in claim 26, further comprising steps of:
merging the first and second sets of filter coefficients; and
downloading the merge result to a filter block of the coherent optical receiver.

* * * * *